W. T. SCHEIDE.
Apparatus for Burning Liquid Fuel and Generating Steam.

No. 140,220. Patented June 24, 1873.

Witnesses:

Inventor:
W. T. Scheide
Per
Attorneys

UNITED STATES PATENT OFFICE.

WILLIAM T. SCHEIDE, OF TIDIOUTE, PENNSYLVANIA.

IMPROVEMENT IN APPARATUS FOR BURNING LIQUID FUEL AND GENERATING STEAM.

Specification forming part of Letters Patent No. 140,220, dated June 24, 1873; application filed April 26, 1873.

*To all whom it may concern:*

Be it known that I, WILLIAM T. SCHEIDE, of Tidioute, in the county of Warren and State of Pennsylvania, have invented a new and useful Improvement in Apparatus for Burning Liquid Fuel and Generating Steam, of which the following is a specification.

It is a well-understood fact that but a small portion of the heat generated in ordinary boiler-furnaces is utilized. The heat absorbed and radiated by the furnace and carried off in the form of smoke, and unconsumed carbon in other forms, is never less than three-fourths of the whole amount generated, and the average is very much more than that.

My invention is an improvement in apparatus adapted for passing the products of combustion through the water to be converted into steam, whereby all of the heat is utilized. The invention aims at simplicity and economy of construction, with great efficiency in practical operation.

Figure 1:
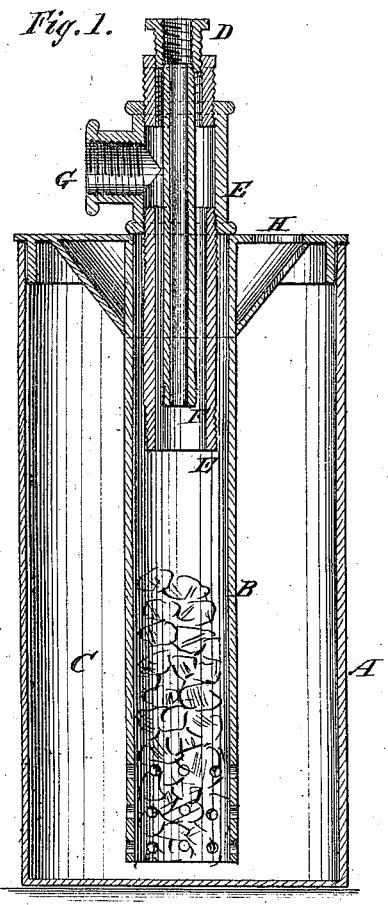
Figure 2:
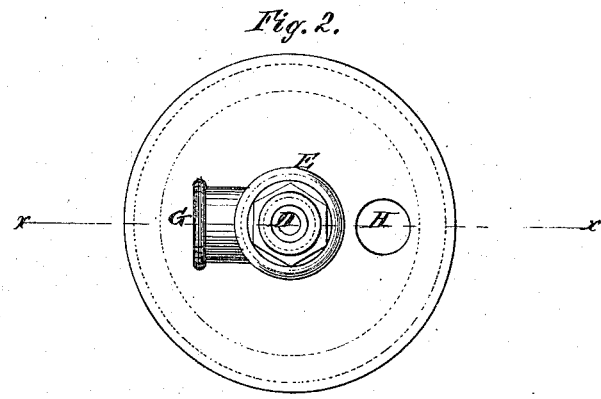

In the drawing, Figure 1 is a vertical section of my apparatus taken on the line $x\ x$ of Fig 2. Fig. 2 is a top-end view.

Similar letters of reference indicate corresponding parts.

A is a cylinder of suitable size and strength, having in its center a combustion-tube, B. This tube is open at the bottom, as seen in the drawing, and is partially filled with broken fire-brick, or other incombustible material. The annular space C is filled with water. In the combustion tube or chamber B I use liquid fuel, or any fuel that burns without leaving a solid ash. The fuel is introduced through the tube D by means of a force-pump. It may be combined with the requisite amount of atmospheric air (or oxygen) to produce perfect combustion before it is pumped in, but in the apparatus shown the air is forced in through the tube E, which surrounds the fuel-tube D, leaving an annular space, F, around the fuel-tube, as seen in the drawing. The air-pump is attached at the point G. The fuel and air are forced into the fire-chamber B together, and ignited by means of electricity, or by any other known means. The current or currents produced are sufficient to force the entire products of combustion up from the bottom of the combustion-tube and through the water, thereby generating steam. The steam so generated is discharged from the boiler into a tube attached at the point H, and conducted to another vessel, or to any desired point.

Instead of pumping the fuel into the combustion-tube it may be drawn in by atmospheric pressure, the necessary vacuum being produced by the current of air forced through the outer tube E.

By this apparatus the entire heat generated is utilized. The incombustible material placed in the combustion-tube tends to break the flame and protect the tube from the effects of heat.

Having thus described my invention, I claim as new and desire to secure by Letters Patent—

The improved apparatus herein described, formed of the cylinder A, provided with a perforated head or cover, the central pendent combustion-tube B, the shorter air-tube E, and fuel-tube D, arranged to leave an annular space between them and concentric with the tube B, all combined as shown and described.

WILLIAM T. SCHEIDE.

Witnesses:
 G. N. MACDONALD,
 SOLON C. KEMON.